US005216620A

United States Patent [19]

Sansone

[11] Patent Number: 5,216,620

[45] Date of Patent: Jun. 1, 1993

[54] REQUESTING, REPORTING AND VERIFICATION SYSTEM AND METHOD FOR MAIL CARRIER PAYMENT

[75] Inventor: Ronald P. Sansone, Weston, Conn.

[73] Assignee: Pitney Bowes Inc., Stamford, Conn.

[21] Appl. No.: 763,787

[22] Filed: Sep. 23, 1991

[51] Int. Cl.[5] .............................................. G06F 15/21

[52] U.S. Cl. .............................. 364/478; 364/464.030

[58] Field of Search .............. 364/478, 464.01–464.03; 209/900, 583, 584; 235/375

[56] References Cited

U.S. PATENT DOCUMENTS 5,072,401 12/1991 Sansone et al. ..................... 364/478

5,119,306 6/1992 Metelits et al. ................ 364/464.02

*Primary Examiner*—Jerry Smith

*Assistant Examiner*—Steven R. Garland

*Attorney, Agent, or Firm*—Peter Vrahotes; Melvin J. Scolnick

[57] ABSTRACT

A system and method for reducing the amount of mail that is submitted to a local post office. A mailer sorts local mail from non local mail, identifies the destination of the non local mail and puts the same in a tray in accordance with the destination thereof. A label is attached to each tray and the tray is weighed. The destination of the mail and the weight thereof is communicated to the post office so that the post office can determine delivery routes and cost of such delivery. The non local mail is then forwarded directly to a common carrier by the mailer who will then deliver the mail to a non local postal distribution center.

10 Claims, 3 Drawing Sheets

REQUESTING, REPORTING AND VERIFICATION SYSTEM AND METHOD FOR MAIL CARRIER PAYMENT

RELATED CASES

Attention is directed to co-pending U.S. patent application Ser. No. 07/459,418, now U.S. Pat. No. 5,119,306, filed Jan. 2, 1990 and entitled Mail Piece Weight Quality Control System and Method U.S. patent application Ser. No. 07/594,515 entitled Method and Apparatus for Preparing Validated Mail Tray Labels and U.S. patent application Ser. No. 641,985 filed Jan. 16, 1991, now abandoned, and entitled Automated Labeling System.

BACKGROUND OF THE INVENTION

Throughout the history of the post office, there has been a gradual evolution whereby the post office encourages mailers to prepare their mail in such a way as to reduce the effort required on the part of the post office for processing such mail. As an inducement to the mailer to prepare the mail in such a way so as to bring about faster mail delivery, the post office offers mailers a discount on such items as presorted mail and printing of 9 digit zip codes. Discounts are also given when the mail is produced in a manner allowing automatic processing with machines such as optical character recognition (OCR) sorters and bar code readers and sorters.

Even with present mail processing techniques that have come into being as a result of reduced postage rates for presorted mail, zip code mail and the like, the post office is still experiencing difficulties in meeting targeted delivery times for the mail. The primary reason for such difficulties is the increase in volume of mail that has taken place over the decades.

Systems and methods have been conceived and described wherein the efforts required by the post office to process mail has been reduced. One of the problems the post office faced previously was that a significant amount of mail presented to the post office did not have the required postage or did not meet the requirements of postal regulations. A scheme for overcoming this problem was disclosed in U.S. patent application Ser. No. 07/594,515, supra. In this patent application, a scheme is disclosed whereby mail is processed in such a manner that the mail is sorted to separate the local mail from the out of state mail, the out of state mail is placed in trays in accordance with their zip codes and a label is printed that identifies the mail in the tray for subsequent routing. As a part of this scheme, the post office is given a running account of the mail being processed so that the postage can be accurately determined and the post office is able to process the mail further without having to inspect the same to assure proper payment. U.S. patent application Ser. No. 641,985, supra, discloses a system whereby labels can be printed for the tray and the sacks into which mail is placed for a common carrier, particularly an air carrier.

Although the concepts described in these two patent applications addressed areas where implementation of activities on the part of the mailer would benefit the post office, there are still many areas where the amount of effort required by the post office can be reduced.

In the processing of mail, mail that is being processed by a mailer to obtain postal discounts is still sent to the post office. This includes non local mail that is subsequently forwarded to a mail carriers for delivery to postal distribution centers. Certain functions are performed within the post office after delivery of such mail to calculate the transportation costs, particularly the payment that must be made from the post office to the common carrier. The amount of payment is dependent on the weight and destination of the mail handled by the common carrier. As a result, mail is still processed through the post office and takes time and space away from the post office. Clearly, it would be advantageous if a scheme could be implemented whereby mail that is not within the servicing area of a local post office does not require handling by such post office.

SUMMARY OF THE INVENTION

A scheme has been devised whereby a mailer processes mail in such a way that mail that is not addressed locally is conveyed directly to a common carrier with sufficient information conveyed to the post office to allow the post office to verify the mail and to determine the fee to be paid the common carrier.

The mail is processed by the mailer in such a way that non local mail and local mail are sorted from one another. The mail is placed into trays and the trays are labeled so as to indicate the contents of the tray. The trays are then placed in sleeves and weighed and a tag is printed indicating the weight of the tray and the contents. The tag is then applied to the sleeve and is scanned and the information on the tag is up-loaded to the data processor of the mailer.

The data processor of the mailer is in communication with the post office and will send pertinent information whereby the post office can determine and verify the amount of postage for the mail to be charged to the mailer, the destination of the mail and the amount required to be paid to the common carrier for the transporting of the mail. After the trays are tagged and scanned, they are placed into receptacles and transported to the common carrier. Based upon the information received from the mailer, the post office charges the mailer for the postage required for the mail and will pay the common carrier without having to process all the mail in a local post office.

DETAILED DESCRIPTION OF THE PREFERRED EMBODIMENT(S)

In order to eliminate the amount of mail that is sent to a local post office for processing, apparatus and method have been conceived whereby non local mail is processed by a mailer and forwarded directly to a common carrier. Provisions are made for giving sufficient information to the post office that allows the post office to pay the common carrier for transporting the mail, determine if the proper postage has been paid by the mailer and verify the mail content.

Figure 1:
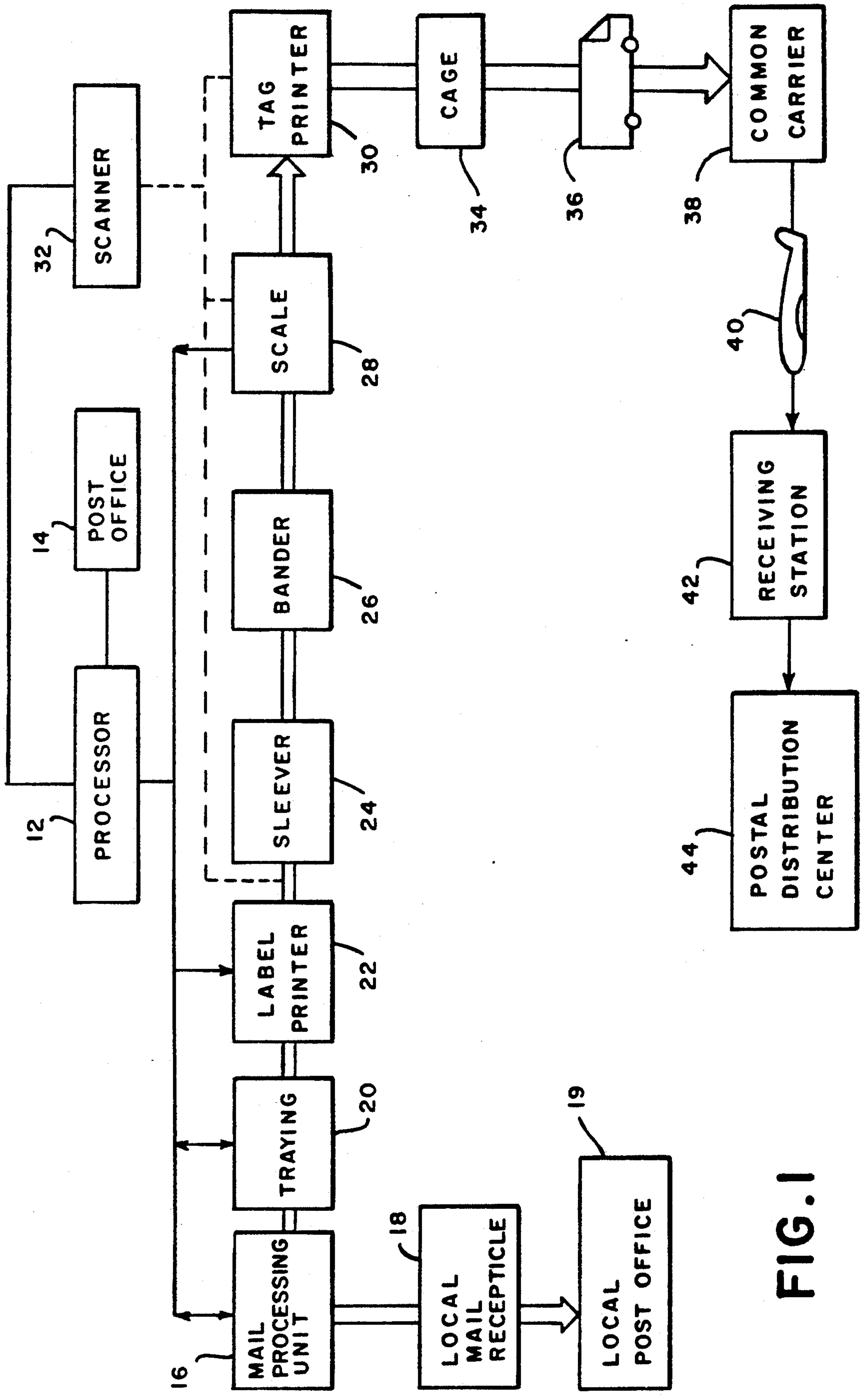
FIG. 1 is a block diagram of a system in which the preferred embodiment of the invention can be performed.

With reference to FIG. 1, a block diagram is shown representing a system capable of practicing the preferred embodiment. The system includes a mailer's data processor 12 that can be any one of a number of commercially available computers such as an IBM Model 80 PS/2. This processor 12 is in selective communication with an office of the post office 14, which performs accounting functions for the post office which will be described hereinafter.

In FIG. 1, the conveyance of mail is indicated by the double lines, communication lines are indicated by single arrows lines and optical paths by dotted lines. Although the conveying devices for conveying items from one unit to another are not described, it will be appreciated such devices are well known in the art and of themselves do not form part of the instant invention except to the extent required to perform the novel concepts disclosed herein.

Figure 2A:
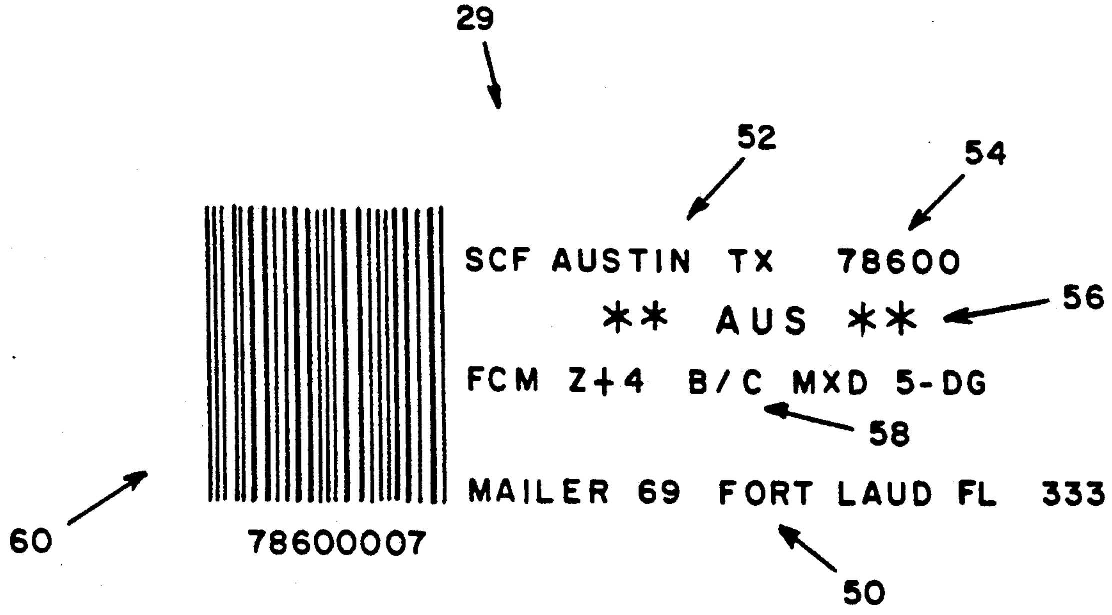
FIG. 2*a* is a plan view of a label and FIG. 2*b* of a tag that can be used in practicing the instant invention.

The mailer's data processor 12 is in communication with a mail processing unit 16 that is a combination of an inserter and a sorter such as a Model Series No. 8100 Inserter, available from Pitney Bowes Inc., and a sorter that sorts mail in accordance with zip codes. Sorters of this type are commercially available and are generally referred to as Optical Character Reader, Channel Sorters. Alternatively, a bar code reader can be used where appropriate. This mail processing unit 16 sorts the local mail, which is placed into a local mail receptacle 18 that is sent to a local post office 19, from non local mail, which is trayed at a mail traying unit 20. The mail processing unit 16 conveys information to the data processor 12 relative to the mail that is to be placed in trays and the data processor controls a label printer 22 to print an appropriate label for each tray that is filed. A label 29 of the type contemplated is shown in FIG. 2*a* and such label will be applied to the tray in any convenient manner. The information conveyed to the processor 12 includes the class of mail and the weight of individual mail pieces, based upon the number and kinds of inserts, so that the postage can be determined. The destination of the mail is also uploaded to the processor 12. Alternatively, such data could be resident in the memory of the processor 12. Thereafter, the mail that has been trayed has the label 29 on the trays scanned and the tray then goes through a sleever unit 24 wherein each tray is placed within a sleeve and then the sleeved tray is banded at a banding unit 26. What has been described heretofore has been disclosed previously, see for example copending U.S. patent application Ser. No. 07/594,515, U.S. patent application Ser. No. 07/459,418 and U.S. patent application Ser. No. 641,985, supra. These patent applications teach methods and apparatus for traying mail, labeling the trays, and providing information to the post office sufficient to authenticate payment of the mail. After the label 29 is attached to the tray, the label is scanned by a scanner 32 and the data therefrom is received by the processor 12 so that a verification can be made that the data on the label is correct. This data is received by the post office which will make routing decisions based upon the destination of the mail in the trays. Upon compiling such routing information, the same will be sent to the processor 12 by the post office 14.

Figure 2B:
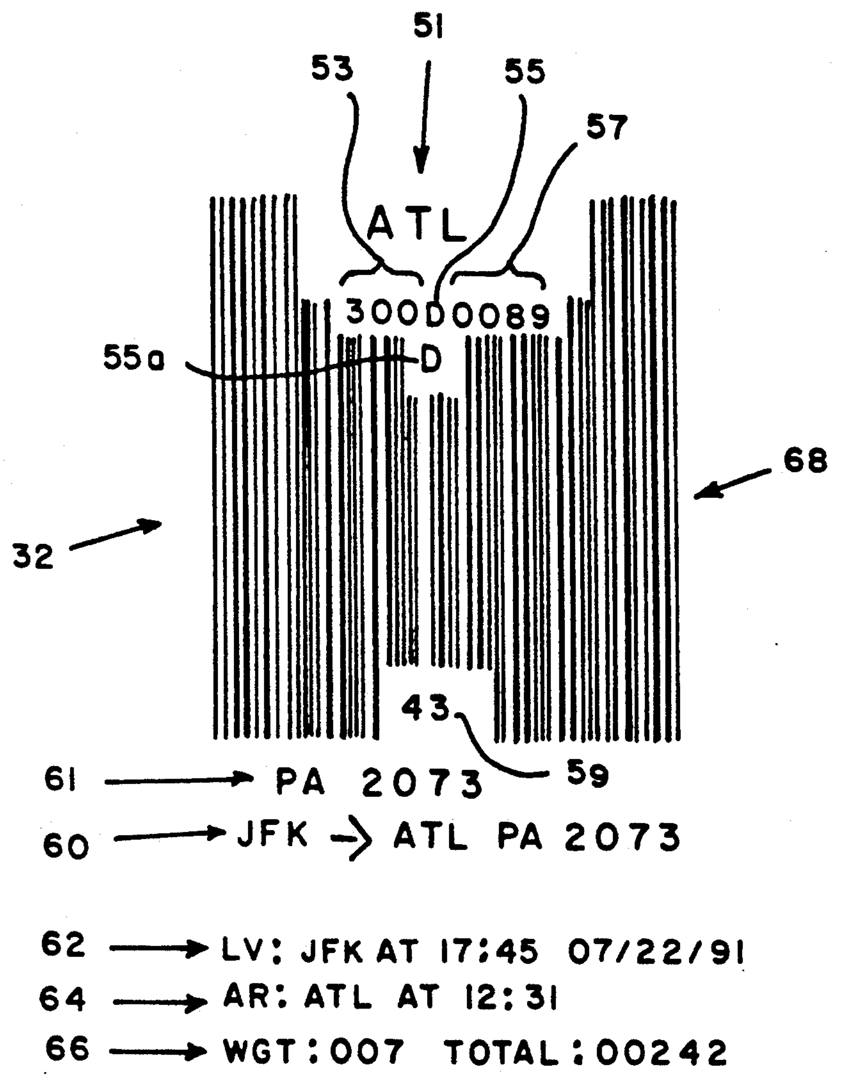

Downstream from the banding unit 26 is a scale 28 that weighs sleeved and banded trays of mail. Such weight determination will be uploaded to the data processor 12 and sent to the post office 14 to be used, in conjunction with the destination data, to calculate the transportation costs payable by the post office to the common carrier. A tag printer 30 is in communication with the processor 12 and is located downstream from the scale 28 for the purpose of printing a tag 32 for giving the common carrier routing information that had been determined by the post office 14. A destination and routing tag 32 produced by such a tag printer 30 is shown in FIG. 2*b*. The tag 32 produced by the tag printer 30 is attached to the tray sleeve and the scanner 32 will scan the tag for purposes of verification. The scanner 30 is in communication with the data processor 12 that receives the data from the scanner 30 and sends the tag information to the post office 14, again for verification. Downstream from the scanner 30 is a cage 34 that receives a number of trays for temporary storage and subsequent transporting. The cage 34 can be any kind of movable container that will hold a large number of trays for subsequent conveyance.

The cage 34, or cages, is then sent to a transporting vehicle such as a truck 36 where it is transported to the common carrier 38. The common carrier 38 will sort the trays in accordance with the information on the tags 32, will then place the sorted mail on other transport vehicles such as an airplane 40, train, truck or the like which will deliver the mail to a receiving station 42 of a postal distribution center 44.

With reference to FIG. 2*a*, the label 29 includes information identifying the mailer 50 and his location including his first three zip code digits, the destination of the tray 52 and the zip code thereof 54, the airport 56 to which the tray is to be sent, and the tray contents 58 including the class of mail, zip code information and degree of sortation. In addition, a bar code 60 in included that contains all the information shown in alphanumeric form.

FIG. 2*b* shows a tag 32 having the destination 50 of the tray, the first three digits of the zip code 52, the class of mail 54, 56 and the identification number 57 of the contract between the post office 14 and the common carrier 38 at the upper portion thereof. At the lower portion is shown the dock number 59 where the tray is to be routed, the airline and flight number 58, the routing information 60, time of departure 62, expected time of arrival 64, and the weight in pounds of the individual tray and total weight of all trays 66 on the particular flight. The tag 32 also contains a bar code 68 that contains all the information given in alphanumeric form. It should be noted that the data on the label 29 is different from the data on the tag 32 for illustration purposes.

In operation, the processor 12 will have a mailing list for a particular run of mail and will also have programmed therein the contents that are to be inserted into envelopes by the inserter of the mail processing unit 16 to form mailpieces and will upload appropriate information to the processing unit. It will be appreciated that the mail list could reside in a processor of the mail processing unit 12. The inserter will then operate either under command of the data processor 12 or its internal processor and generate the mail pieces in accordance therewith. Because the mail processing unit 16 is under control of the data processor 12, it will be able to sort the local mail 18 from the non local mail, the latter being directed to the mail traying unit 24. After the mail is trayed in accordance with its destination, the label printer 22 will print a label 29 for the appropriate tray under control of the data processor 12 in accordance with the information from the stored mail list. Reference can be had to U.S. patent application Ser. No. 07/594,515, supra, for details as to the manner in which mailpieces are placed into trays in accordance with their zip codes and how the data processor coordinates the activities to assure that correct postage is paid, that the requirements of the domestic mail manual are met with regard to postal discounts and that the label printer 22 prints an appropriate label that is placed in or received by a tray. What has been described up to now does not form part of the invention as the same has been disclosed previously.

The labels on the trays are scanned by the scanner 32 and the labeled trays are placed into sleeves and banded by the sleever 24. The data resulting from the scanned label 29 is received by the processor 12 and the data is forwarded to the post office 14. It should be noted at this time that the label on a tray is primarily for the benefit of the post office for verification and for the mail distribution centers 44, which could receive such data from the post office for purposes of preparation. The label 29, as stated previously, will have specific information such as location 52 of the postal distribution center 44 to which the mail is sent, the zip code thereof 54, the tray contents 58, and the identification of the mailer 50.

The tray is placed into a sleeve and banded by the sleeving unit 24 and banding unit, respectively. A tag 32, which is referred to as a a destination and routing tag, is printed and placed on the sleeve for the benefit of the post office to provide verification information and the common carrier so that the distribution center to which the mail is to be sent is identified. Before printing the tag 32, however, the tray is weighed. This weighing by the scale 26 is for the purpose of allowing the post office to determine the fee due to the common carrier for transporting the tray. Whereas the post office 14 determines the postage due from the mailer based upon individual mailpieces, the common carrier is paid in accordance with the bulk weight of the "freight" and its destination. The tag printer 28 will print the tag 32, such as that shown in FIG. *2b*, under control of the processor 12 that has data resulting from scanning of the label 29, weighing of the tray and destination and routing information from the post office. The data printed on the tag 32 will show the destination of the tray as well as the contents of the tray and the weight. All this data will be included in bar code format 60 so that the information can be derived quickly using a bar code scanner. After the tag 32 has been scanned by the scanner 32 the trays are placed into the cages 34. These cages are then placed on transportation vehicles 36, sent to a common carrier 38 where the trays will be sorted in accordance with their destination and eventually to postal distribution centers 44.

Thus what has been shown and described is an apparatus and method for the purpose of processing non local mail whereby the local post office need not physically receive the non local mail and be required to subsequently transport it to a common carrier. In this way, a large volume of mail need not be handled by a local post office and time and expense are saved.

What is claimed is:

1. A system for processing mail including a processor, means for sorting local mail from non local mail, means for traying the non local mail, means for printing mail distribution labels, and means for placing a labeled tray into a sleeve, the improvement comprising: a scale in communication with the processor, a tag printer in communication with the processor, a scanner for scanning labels and tags in communication with the processor and means for delivering trays to a common carrier.

2. The system of claim 1 further including means for receiving and combining sleeved trays having tags thereon.

3. The system of claim 2 further including means for banding sleeved tray before delivery to said receiving and combining means.

4. The system of claim 1 including a post office in communication with said processor.

5. In a method of processing mail including the steps of sorting mail in accordance with the destination thereof, sorting local mail from non local mail traying the non local mail, printing mail distribution identity labels, attaching the labels to the trays and placing the labeled trays into sleeves, the improvement comprising:

a) weighing the sleeved trays, b) determining the routing of the trays, printing a tag showing the weight and the destination and routing of each tray, c) delivering tagged trays to a common carrier, and d) determining the cost of transporting the non local mail.

6. The method of claim 5 including the further step of paying the cost of transporting the trayed, non local mail to the common carrier.

7. The method of claim 5 wherein step b) includes providing routing information to the tray.

8. The method of claim 7 including making a determination of the trays to be sent by the common carrier to a given location and printing on a tag the weight of the mail to be sent to said given location.

9. The method of claim 5 wherein weighing information derived from step a) is sent to the post office and the post office makes the routing determination of step b) and determines the transportation cost of step d).

10. The method of claim 9 wherein the post office pays the cost of transportation to the common carrier.

* * * * *